United States Patent [19]
Limberg

[11] Patent Number: 6,081,301
[45] Date of Patent: Jun. 27, 2000

[54] DTV CIRCUITRY FOR MEASURING MULTIPATH DISTORTION BASED ON GHOSTING OF DATA SEGMENT SYNCHRONIZING SIGNALS

[75] Inventor: Allen LeRoy Limberg, Vienna, Va.

[73] Assignee: SamSung Electronics Co., Ltd., Suwon, Rep. of Korea

[21] Appl. No.: 09/229,607

[22] Filed: Jan. 13, 1999

[51] Int. Cl.[7] ............................................ H04N 5/21
[52] U.S. Cl. ........................ 348/614; 348/607; 348/914
[58] Field of Search ................................. 348/607, 614, 348/914, 611, 624, 623, 725, 726; 375/350, 348, 346, 349, 232; H04N 5/21, 5/213

[56] References Cited

U.S. PATENT DOCUMENTS 5,835,131  11/1998  Limberg ................................. 348/607

OTHER PUBLICATIONS

C. M. Zhao, X.Y. Hu and X.H. Yu, "Block Sequential Least Squares Decision Feedback Equalization Algorithm with Application to Terrestrial HDTV Transmission", Sep. 1998, IEEE Transactions on Broadcasting, vol. 44, No. 3.

Primary Examiner—Sherrie Hsia
Attorney, Agent, or Firm—Robert E. Bushnell, Esq.

[57] ABSTRACT

Baseband DTV signals are supplied to a cascade filter connection of a transversal filter operative over many data segments and a match filter for data segment synchronizing (DSS) signals. The accumulated random data in the cascade filter response is suppressed by coring, to generate a signal ensemble descriptive of ghosted DSS signal. The transmission channel is characterized based on this ensemble, and the coefficients of a complementary channel-equalization and ghost cancellation filter are calculated based on this characterization.

20 Claims, 6 Drawing Sheets

DTV CIRCUITRY FOR MEASURING MULTIPATH DISTORTION BASED ON GHOSTING OF DATA SEGMENT SYNCHRONIZING SIGNALS The invention relates to transmission-channel equalization and deghosting in digital television (DTV) receivers.

BACKGROUND OF THE INVENTION

Multipath reception conditions give rise to ghosts in NTSC television reception. Multipath signals that arrive at the receiver with enough time displacement from the principal signal as to cause discernible ghosts in a received television image are referred to as "macro-ghosts". Multipath signals which arrive over a transmission path of lesser length than the strongest or "principal" signal reach the receiver earlier and are referred to as "pre-ghosts"; the ghost images they cause in a received television image appear to the left of the desired image. Pre-ghosts occurring in off-the-air reception can be displaced as much as 6 microseconds from the "principal" signal, but typically displacements are no more than 2 microseconds. Multipath signals which arrive over a transmission path of greater length than the strongest or "principal" signal reach the receiver later and are referred to as "post-ghosts"; the ghost images they cause in a received TV image appear to the right of the desired image. Typically, the range for post-ghosts extends to 40 microseconds displacement from the "principal" signal, with 70% or so of post-ghosts occurring in a sub-range that extends to 10 microseconds displacement. Multipath signals that arrive at the receiver with not enough time displacement from the principal signal as to cause discernible ghosts in a received television image, but which affect transient response, are referred to as "micro-ghosts". Macro-ghosts are more common in over-the-air terrestrial broadcasts than cablecasting, in which micro-ghosts commonly occur because of reflections. Similar multipath reception conditions obtain in digital television (DTV) systems as in NTSC and other analog television systems.

In September 1995 the Advanced Television Systems Committee (ATSC) published a standard for digital high-defmition television (HDTV) signals that has been accepted as the defacto standard for terrestrial broadcasting of digital television (DTV) signals in the United States of America. The standard will accommodate the transmission of DTV formats other than HDTV formats, such as the parallel transmission of four television signals having normal definition in comparison to an NTSC analog television signal. The standard uses vestigial-sideband (VSB) amplitude modulation (AM) to transmit the DTV signals, designed for transmission through 6-Mz-bandwidth ultra-high-frequency (UBF) channels that correspond to channels currently used for analog television transmission.

DTV transmitted by VSB AM during terrestrial broadcasting in the United States of America comprises a succession of consecutive-in-time data fields each containing 313 consecutive-in-time data segments or data lines. Each segment of data is preceded by a data segment synchronization (DSS) code group of four symbols having successive values of +S, –S, –S and +S. The value +S is one level below the maximum positive data excursion, and the value –S is one level above the maximum negative data excursion. The segments of data are each of 77.3 microsecond duration, and there are 832 symbols per data segment for a symbol rate of about 10.76 million bauds or symbols per second. The initial line of each data field is a data field synchronization (DFS) code group that codes a training signal for channel-equalization and multipath suppression procedures. The remaining lines of each data field contain data that have been Reed-Solomon forward error-correction coded. In over-the-air broadcasting the error-correction coded data are then trellis coded using twelve interleaved trellis codes, each a ⅔ rate trellis code with one uncoded bit. Trellis coding results are parsed into three-bit groups for over-the-air transmission in eight-level one-dimensional-constellation symbol coding, which transmission is made without symbol pre-coding separate from the trellis coding procedure. Trellis coding is not used in cablecasting proposed in the ATSC standard. The error-correction coded data are parsed into four-bit groups for transmission as sixteen-level one-dimensional-constellation symbol coding, which transmissions are made without preceding.

The carrier frequency of a VSB DTV signal is 310 kHz above the lower limit frequency of the TV channel. The VSB signals have their natural carrier wave, which would vary in amplitude depending on the percentage of modulation, suppressed. The natural carrier wave is replaced by a pilot carrier wave of fixed amplitude, which amplitude corresponds to a prescribed percentage of modulation. This pilot carrier wave of fixed amplitude is generated by introducing a direct component shift into the modulating voltage applied to the balanced modulator generating the amplitude-modulation sidebands that are supplied to the filter supplying the VSB signal as its response. If the eight levels of 4-bit symbol coding have normalized values of –7, –5, –3, –1, +1, +3, +5 and +7 in the carrier modulating signal, the pilot carrier has a normalized value of 1.25. The normalized value of +S is +5, and the normalized value of –S is –5.

Ghosts are a problem in digital television (DTV) transmissions as well as in NTSC analog television transmissions, although the ghosts are not seen as such by the viewer of the image televised by DTV. Instead, the ghosts cause errors in the data-slicing procedures used to convert symbol coding to binary code groups. If these errors are too frequent in nature, the error correction capabilities of the DTV receiver are overwhelmed, and there is catastrophic failure in the television image. If such catastrophic failure occurs infrequently, it can be masked to some extent by freezing the last transmitted good TV images, such masking being less satisfactory if the TV images contain considerable motion content. The catastrophic failure in the television image is accompanied by loss of sound.

The training signal or ghost-cancellation reference (GCR) signal in the initial line of each data field of an ATSC-standard DTV signal is a 511-sample pseudo-random noise sequence (or "PN sequence") followed by three 63-sample PN sequences. A 511-sample PN sequence is referred to as a "PN511 sequence" and a 63-sample PN sequence is referred to as a "PN63 sequence". The middle ones of the 63-sample PN sequences in the field synchronization codes are transmitted in accordance with a first logic convention in the first line of each odd-nunbered data field and in accordance with a second logic convention in the first line of each even-numbered data field, the first and second logic conventions being one's complementary respective to each other. This training signal has not worked well in practice, however.

The middle PN63 sequence of the ATSC field synchronization code, as separated by differentially combining corresponding samples of successive field synchronization code sequences, can used as a basis for detecting ghosts. Pre-ghosts of up to 53.701 microseconds (4+511+63=578 symbol epochs) before the separated middle PN63 sequence can be detected in a discrete Fourier transform (DFT) procedure without have to discriminate against data in the last data segment of the preceding data field. However, the post-ghosts of such data can extend up to forty microseconds into the first data segments and add to the background clutter that has to be discriminated against when detecting pre-ghosts of the separated middle PN63 sequence. Post-ghosts of up to 17.746 microseconds (63+104+24=191 symbol epochs) after the separated middle PN63 sequence can be detected in a discrete Fourier transform (DFT) procedure without have to discriminate against data in the A precode and in the data segment of the succeeding data field. Longer-delayed post-ghosts have to be detected while discriminating against background clutter that includes data. A match filter for the PN63 sequence may not have enough peak energy in its response that detection of longer-delayed post-ghosts is sufficiently sensitive. The middle PN63 sequence of the ATSC field synchronization code provides more pre-ghost canceling capability than required in practice, but insufficient post-ghost canceling capability. Post-ghosts delayed up to forty microseconds after principal signal occur in actual practice. However, pre-ghosts preceding the principal signal by more than four microseconds are rare, according to page 3 of the T3S5 Report Ghost Canceling Reference Signals published Mar. 20, 1992 by the ATSC.

If one seeks to exploit the autocorrelation properties of the PN511 sequence in the ATSC DTV signal for selection of ghosts in a DFT procedure, the selection filter has to discriminate PN511 sequence and its ghosts from background clutter that includes data and the initial and final PN63 sequences. This background clutter has substantial energy, so weaker ghosts of the PN511 sequence are difficult to detect.

The higher energy response of the PN511 autocorrelation filter used for ghost detection cannot be fially exploited because data and the initial and final PN63 sequences increase so much the energy of the background clutter that the filter is to discriminate against.

The objective of the inventor was to find a way to characterize the transmission channel through which a DTV signal was received that would be better in terms of speed and in terms of increased capability for suppressing long-delayed post ghosts. At the time the invention was made it was known that long-term accumulation procedures could be employed together with a matched filter algorithm to derive a better training signal from the PN sequences in the DFS signals. Accumulation is done on corresponding samples of the DFS signal in a comb filtering procedure extending over several data fields. So, the time required in order to extract such a better training signal extends over several data field intervals. When multipath conditions are dynamic in nature, the long-term accumulation procedures repeatedly fail to open the data eyes sufficiently to permit decision feedback methods to take over adjustment of channel-equalization and ghost-cancellation filter coefficients. The common wisdom at the time of the invention was that accumulation of match filter response to the longer-duration PN511 sequence would result in better separation of that signal and its ghosts from background clutter than would accumulation of match filter response to the shorter-duration PN63 sequence.

The inventor found this would be so only for accumulation over a few data fields, supposing similar background clutter accompany each signal offered for accumulation. As the number of samples being combined in the correlation procedures associated with accumulation of respective match filter responses becomes large enough for statistics to assert themselves in regard to randomness of data contributing to background clutter, the ratio of the energy of the accumulated correlated PN sequence to the energy of the accumulated uncorrelated random data and noise in the background clutter approaches the same asymptotic value for both correlation procedures. The inventor discerned that match filtering selected over random background clutter based on the total number of samples that were combined, rather than just the kernel width of the match filter.

The match filter for PN511 sequence has pronounced advantage over a match filter for PN63 sequence, the inventor understood, in rejection of response to misphasing of the kernel to a signal that cyclically repeats that kernel. The PN sequences are purposely designed to have negligible correlation with their mis-phased selves. So superior selectivity of the match filter for wider-kernel PN sequence is evidenced more during autocorrelation than when discriminating against randomly varying background clutter.

It occurred to the inventor that over a data field the energy in the accumulated match filter response to data segment synchronizing (DSS) signal is substantially twice the energy in the accumulated match filter response to the repeating PN sequences in the data field synchronizing (DFS) signal in the initial data segment of each data field. While a match filter for the DSS signal has only four symbol epochs therein, as opposed to the 637 symbol epochs that repeat themselves in the DFS signal, the DSS signal appears in each of the 313 data segments of each data field rather than once, for 4×313/637=1.965 times as much energy per data field. The inventor was led by this observation to believe that match filter response to the baseband DTV signal as accumulated in a transversal filtering procedure across a plurality of data segments would generate a superior training signal. The equivalent filtering procedure of transversal filtering across a plurality of data segments, to supply input signal to a match filter for the DSS signal would be an alternative way to generate that superior training signal.

SUMMARY OF THE INVENTION

The invention is directed to an improvement in a digital television receiver having a demodulator for recovering baseband symbol coding, circuitry for extracting a training signal and ghosts thereof from baseband symbol coding, a computer for generating a transmission channel characterization based on the training signal and ghosts thereof as extracted from baseband symbol coding, and adaptive channel-equalization and ghost cancellation filter circuitry for the baseband symbol coding. Weighting coefficients in the kernels of the adaptive channel-equalization and ghost cancellation filter circuitry are initialized in response to the transmission channel characterization. In the improvement the circuitry for extracting training signal from baseband symbol coding is of a type that extracts data segment synchronizing signals and their ghosts from baseband symbol coding for application to the computer, which generates the transmission channel characterization by measuring multipath distortion based on the ghosting of the data segment synchronizing signals.

In preferred embodiments of the invention training signal is extracted from baseband symbol coding using a cascade filter connection for supplying a cascade filter response to the baseband symbol coding. A match filter for data segment synchronizing signal is included in the cascade filter connection. So is a transversal filter additively combining its input signals, as supplied thereto at data segment intervals, for generating an output signal therefrom. A corer generates the training signal from the cascade filter response.

DETAILED DESCRIPTION

Figure 1:
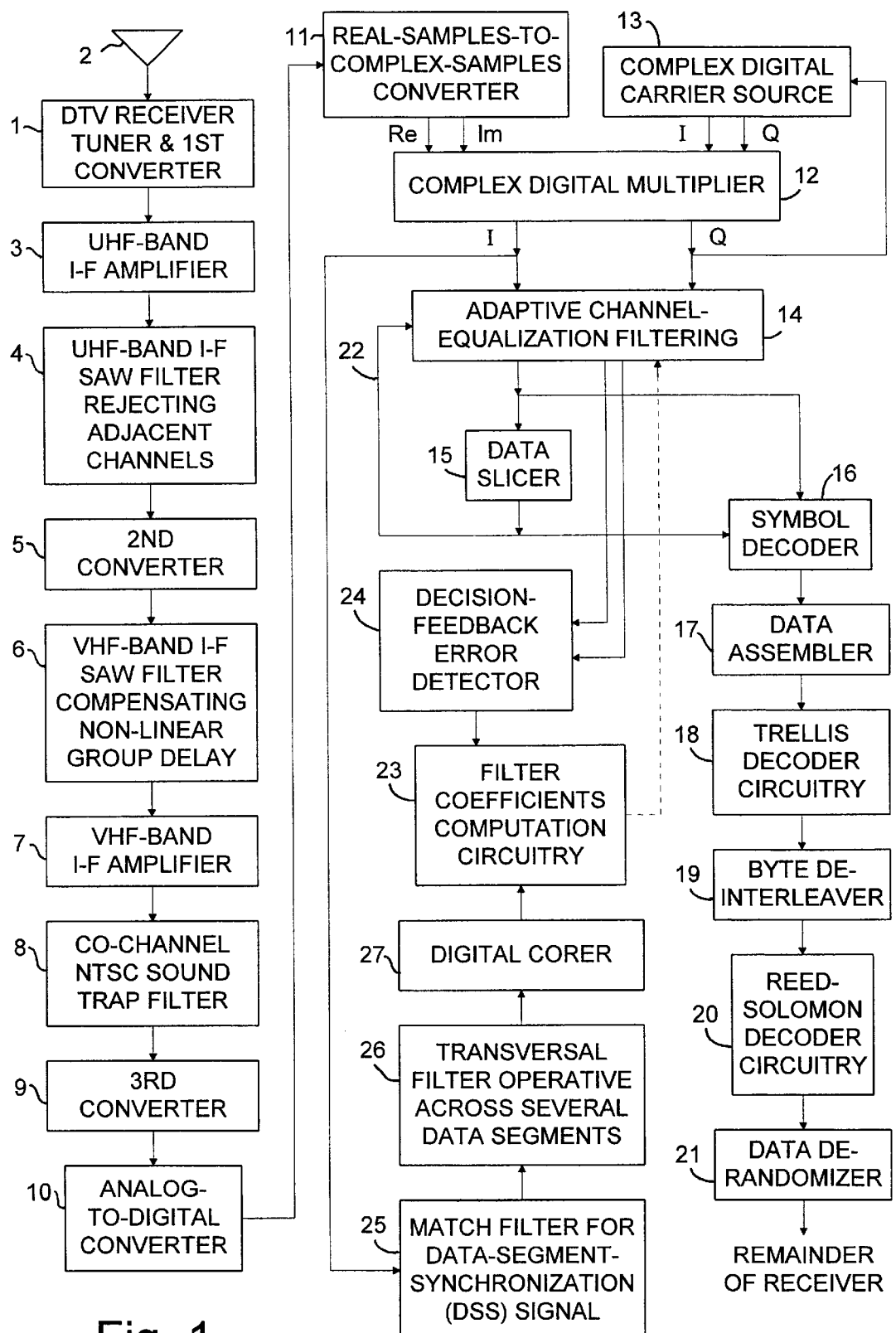
FIGS. 1, 2 and 3 are each a block schematic diagram of a DTV signal receiver that embodies the invention.

FIG. 1 shows a DTV signal receiver that synchrodynes low-band final-intermediate-frequency signals to baseband in the digital regime. The FIG. 1 DTV signal receiver includes tuner and first converter circuitry 1 for generating an ultra-high-frequency (UHF) intermnediate-frequency (I-F) signal in response to received broadcast DTV signals, which FGURE 1 shows being supplied from an antenna 2. FIG. 1 shows a broadcast receiving antenna 2 arranged to capture the DTV signals for the tuner and first converter circuitry 1. Alternatively, the tuner and first converter circuitry 1 can be connected for receiving DTV signals from a narrowcast receiving antenna or from a cablecast transmission system.

The tuner and first (frequency) converter circuitry 1 is similar to that used in prior-art DTV signal receivers. The tuner input has a bandpass filter that limits the frequency range of radio-frequency input signals to the 50 to 810 MHz band, rejecting image frequencies above 920 MHz. The tuner also includes a broadband tracking filter that rejects television signals other than that selected for viewing, especially those signals of higher power such as analog TV signals in next-to-adjacent channels. The first converter includes a first local oscillator tunable over a range from 970 to 1730 MHz to place the initial I-F signal in a 6-MHz-wide band with the carrier nominally at 920 MHz. These local oscillator frequencies are such that any leakage from the tuner input will not interfere with UHF TV channels as may be received by another television signal receiver nearby. At the same time second harmonics of UHF TV channels 14 through 69 fall above the initial I-F band. The mixer in the first converter is a highly linear doubly-balanced type to avoid even harmonic generation. There is a broadband tuned coupling for rejecting image frequencies in output signal from the tuner and first converter circuitry 1, which output signal is supplied to an intermediate-frequency amplifier 3 as its input signal.

The I-F amplifier 3 supplies amplified UHF I-F signal for driving a first surface-acoustic-wave (SAW) filter 4. A SAW filter for these frequencies is usually constructed on a gallium arsenide substrate. The I-F amplifier 3 drives the SAW filter 4 from the source impedance prescribed for avoiding multiple reflections that interfere with obtaining good group delay and provides constant, linear gain to overcome the 10–12 db insertion loss in the SAW filter 4. The upconversion to the UHF intermediate frequencies facilitates the SAW filter 4 having a large number of poles and zeroes. The SAW filter 4 has a −1 dB to −1 dB bandwidth 5.5 to 6 MHz wide, and its passband is designed to pass those frequencies obtained by converting to the UHF I-F band those frequencies extending from the lower limit frequency of the television channel up to the upper limit frequency of the television channel. The SAW filter 4 determines the overall bandwidth of the DTV receiver, suppressing response to adjacent channels.

A second (frequency) converter 5 heterodynes the response of the first SAW filter 4 with oscillations from a second local oscillator within the converter 5, to generate a response to DTV signal translated to a very-high-frequency (VHF) intermediate-frequency band below the frequencies assigned for television broadcasting. A second SAW filter 6 is used for rejecting the unwanted image frequencies that accompany the VHF downconversion result supplied from the second converter 5. The SAW filter 6 has flat amplitude response over a bandwidth extending over the 5.38 MHz band the VHF I-F DTV signal is expected to repose in. The SAW filter 6 has a phase response designed for optimizing overall phase response for the DTV receiver up to the point that synchrodyning to baseband is completed.

The second converter 5 includes a linear mixer therein, which is designed to drive the SAW filter 6 from the source impedance prescribed for suppressing multiple reflections. The second converter 5 is preferably of a design that provides sufficient conversion gain to overcome insertion loss in the SAW filter 6. If the second converter 5 is of a design that does not provide substantial conversion gain, the gain in the UHF I-F amplifier 3 is increased to overcome insertion losses in both the SAW filters 4 and 6. Alternatively, an additional fixed-gain amplifier is included between the first SAW filter 4 and the second converter 5 to compensate for the insertion loss in the second SAW filter 6.

The VHF I-F signal supplied as the response of the second SAW filter 6 is applied as input signal to a very-high-frequency intermediate-frequency amplifier 7, which generates an amplified VHF I-F signal response to its input signal. The VHF I-F amplifier 7 is subject to reverse automatic gain control. The VHF I-F amplifier 7 has a co-channel NTSC sound-trap filter 8 associated therewith. The sound-trap filter 8 can be located at an intermediate point in the VHF I-F amplifier 7, but FIG. 1 shows the sound-trap filter 8 being located after the VHF I-F amplifier 7 and before a third (frequency) converter 9.

The third converter 9 heterodynes the VHF I-F amplifier 7 response with scillations from a third local oscillator in a linear third mixer. The frequency of the oscillations from the third local oscillator is chosen such that the third mixer supplies a final intermediate-frequency signal response in a final intermediate-frequency band closer to baseband than the VHF I-F band. This final I-F band is low enough in frequency to make analog-to-digital conversion feasible. This final I-F band is offset a megahertz or so from baseband to facilitate the generation of complex digital signals in response to the final I-F signal. The third converter 9 response is digitized by an analog-to-digital converter 10 before being synchrodyned to baseband in the digital regime. The digitized third converter 9 response is supplied from ADC 10 to a real-samples-to-complex-samples converter 11 that generates imaginary samples from those real samples of digitized third converter 9 response received as input signal. The real-samples-to-complex-samples converter 11 also delays the real samples of digitized third converter 9 response to be in correct temporal alignment with the generated imaginary samples of digitized third converter 9 response, thereby to supply samples of digitized third converter 9 response in digital complex-number format.

These samples of digitized third converter 9 response in digital complex-number format are supplied as multiplicand input signal to a complex digital multiplier 12 receiving its multiplier input signal from a source 13 of synchrodyning carrier wave in digital complex-number format. This source 13 of synchrodyning carrier wave typically includes read-only memory (ROM) storing sine and cosine look-up tables descriptive of the synchrodyning carrier wave in digital complex-number format. An address counter addresses the ROM with the count of oscillations supplied by a controlled fourth local oscillator. The imaginary portion of the complex product output signal from the complex digital multiplier 12 is lowpass filtered in processing that generates an automatic frequency and phase control (AFPC) signal for the fourth local oscillator. This AFPC signal minimizes the imaginary low-frequency portion of the complex product output signal and maximizes the real low-frequency portion of the complex product output signal, in a carrier acquisition subprocedure that is a part of the overall channel equalization procedure.

Channel-equalization filtering 14 receives as input signal either all the samples of the complex product output signal generated by the multiplier 12, or just the samples of the real portion of that complex product output signal. FIG. 1 shows the channel-equalization filtering 14 supplying its output signal to a symbol decoder 16 both directly and via a quantizer or data slicer 15. The data slicer 15 is a digital bin comparator, with the bin numbers corresponding to ideal symbol code levels. So, the response of the data slicer 15 is forced to be one of the ideal symbol code levels. These hard-decision results are supplied to the symbol decoder 16 as possible symbol decoding results. The channel-equalization filtering 14 response as supplied to the data slicer 15 is supplied to the symbol decoder 16 for decoding symbol codes on a soft-decision basis using a Viterbi algorithm. For details concerning one way to carry out symbol decoding the reader is referred to U.S. Pat. No. 5,508,752 entitled "PARTIAL RESPONSE TRELLIS DECODER FOR HIGH DEFINITION TELEVISION (HDTV) SYSTEM" and issued to D. J. Kim, H. S. Kwak and H. J. Nam on Apr. 16, 1996.

The symbol decoder 16 supplies symbol decoding results in 3-parallel-bit groups, assembled by a data assembler 17 for application to trellis decoder circuitry 18. Trellis decoder circuitry 18 conventionally uses twelve trellis decoders. The trellis decoding results are supplied from the trellis decoder circuitry 18 to byte de-interleaver circuitry 19. Byte de-interleaver circuitry 19 parses the trellis decoding results into bytes and performs diagonal byte interleaving over a prescribed portion of the data field to recover bytes of Reed-Solomon error-correction coding for application to Reed-Solomon decoder circuitry 20. Reed-Solomon decoding by the circuitry 20 generates an error-corrected byte stream supplied to a data de-randomizer 21. The data de-randomizer 21 supplies reproduced data to the remainder of the receiver (not shown). The remainder of a complete DTV receiver will include a packet sorter, an audio decoder, an MPEG-2 decoder and so forth. The remainder of a DTV signal receiver incorporated in a digital tape recorder/reproducer will include circuitry for converting the data to a form for recording.

The channel-equalization filtering 14 is presumed to employ the commonplace configuration that includes an infinite-impulse-response (IIR) output filter in cascade after a finite-impulse-response (FIR) input filter. An FIR feedback filter receiving the output signal of the data slicer 15 as input signal via the connection 22 is included within the IIR output filter, together with a digital subtractor differentially combining the input and feedback filter responses to generate input signal for the data slicer 15.

The channel-equalization filtering 14 is adaptive, with at least some of its filter coefficients being subject to change as calculated by computation circuitry 23. After channel equalization is achieved, decision-feedback techniques can be employed to maintain channel equalization despite changes in multipath conditions. A decision-feedback error detector 24 differentially combines signals from the channel-equalization filtering 14, which signals relate to the data slicer 15 input and output signals. The error detector 24 supplies the resulting decision-feedback error signal to the computation circuitry 23 for implementing the decision-feedback techniques that are employed to maintain channel equalization despite changes in multipath conditions. Decision-directed methods are better implemented by including a companion digital filter in the computation circuitry 23. Such a procedure using a least-mean-squares (LMS) optimization procedure implemented on a block-sequential basis is described in U.S. Pat. No. 5,648,987 entitled "RAPID-UPDATE ADAPTIVE CHANNEL-EQUALIZATION FILTERING FOR DIGITAL RADIO RECEIVERS, SUCH AS HDTV RECEIVERS" issued Jul. 15, 1997 to J. Yang, C. B. Patel, T. Liu and A. L. R. Limberg. C. M. Zhao, X. Y. Hu and X. H. Yu indicate in their September 1998 paper "Block Sequential Least Squares Decision Feedback Equalization Algorithm with Application to Terrestrial HDTV Transmission" appearing in IEEE Transactions on Broadcasting, Vol. 44, No. 3, that using block-sequential LMS optimization procedures rather than continuous LMS optimization procedures permits a bit error rate of $3 \times 10^{-9}$ to be achieved with signals having 3.5 dB poorer signal-to-noise ratio.

Initialization of the filter coefficients channel-equalization filtering 14 is done in response to a training signal. In DTV receivers embodying the invention training signal is derived from the DSS signal that occurs once each data segment, rather than from the DFS signal that occurs once each data field. Except for the derivation of the training signal, which shall be described in detail further on in this specification, the channel-equalization and de-ghosting procedures are similar to those already disclosed in the art. In order to evaluate the nature of multipath distortion, the computation circuitry 23 compares the prescribed training signal, as received by the receiver with multi-path distortion, with an ideal prescribed training signal free from multi-path distortion as stored at the receiver. The computation circuitry 23 has random-access memory (RAM) included therein for storing data sequences descriptive of the received training signal and any ghosts thereof.

Especially if the differential delays between the principal received signal and its ghosts are not too long, discrete Fourier transform (DFT) methods can be used to initialize the kernel weights for the digital filtering in a very short time. The DFT of the prescribed training signal with multi-path distortion as received by the receiver is calculated and divided by the DFT of the prescribed training signal to determine the DFT of the transmission channel, a process referred to as "characterizing the channel". The complement of the channel DFT describes the DFT the adaptive channel-equalization filtering 14 should have, and the kernel weights are determined accordingly. These calculations are carried out by a micro-processor with suitable software being included in the computation circuitry 23. The computation circuitry 23 can include read-only memory (ROM) for storing the DFT of the prescribed training signal. This saves having to calculate the DFT of the prescribed training signal from the prescribed training signal per se as stored and read from ROM.

If the differential delay between the principal received signal and a ghost thereof is substantial, several microseconds or tens of microseconds, a match filter for the training signal can be included in the computation circuitry 23 and used in conjunction with a microprocessor also included in the computation circuitry 23 for determining the differential delay and the relative magnitude of the ghost. This can speed up the calculation of kernel weights for filters which use programmable bulk delay between sparse groupings of taps to have non-zero weights.

DTV receivers embodying the invention differ from previously known DTV receivers in the way that the training signal is extracted in reliance upon the data segment synchronizing (DSS) signals rather than in reliance upon portions of the data field synchronizing (DFS) signals. FIG. 1 shows the digitized baseband symbol coding recovered as the in-phase (real) response of the complex digital multiplier 12 being applied as input signal to a match filter 25 for DSS signal. The response of the match filter 25, which is of particularly substantial amplitude when DSS signal occurs, is applied as input signal to a transversal filter 26 operative across several data segments. The transversal filter 26 accumulates corresponding samples from each data segment to generate each sample of its response. The response of the match filter 25 to DSS component in each data segment will correlate from data segment to data segment to be strongly reinforced in the response of the transversal filter 26. The response of the match filter 25 to random data in each data segment will not be correlated from data segment to data segment and will tend to average to relatively low value in the response of the transversal filter 26. The more significant bits of the transversal filter 26 response will depend on the integrated response of the match filter 25 to DSS component in each data segment. In a less preferred embodiment of the invention, these more significant bits of the transversal filter 26 response are selected by a wired connection for application as training signal to the computer 23 that is used to calculate the filter coefficients for the channel-equalization filtering 14, with the less significant bits of the transversal filter 26 response being discarded.

The wired connection selecting the more significant bits of the transversal filter 26 response for application to the computer 23 as training signal is a substantial equivalent of a digital corer 27 employed in preferred embodiments of the invention for extracting training signal from the transversal filter 26 response. The digital corer 27 replaces each of a group of least significant bits of its input signal as expressed in two's complement form by its sign bit, then adds the sign to the modified input signal to generate a digital cored response. This is a rounding toward arithmetic zero operation which suppresses smaller amplitude input signal, but has little effect on larger amnplitude input signal. Similar-amplitude positive and negative ghosts are subject to more similar rounding off rules than is the case where rounding off is done simply by discarding less significant bits. The different rounding off procedures do not differ much in result if the computer 23 uses the training signal simply to initialize the coefficients of the adaptive channel-equalization filtering 14. However, if the training signal is used thereafter for incremental adjustment of the filter coefficients, the more similar rounding off rules for positive and negative ghosts help avoid errors in integration of incremental adjustments of the filter coefficients.

Figure 2:
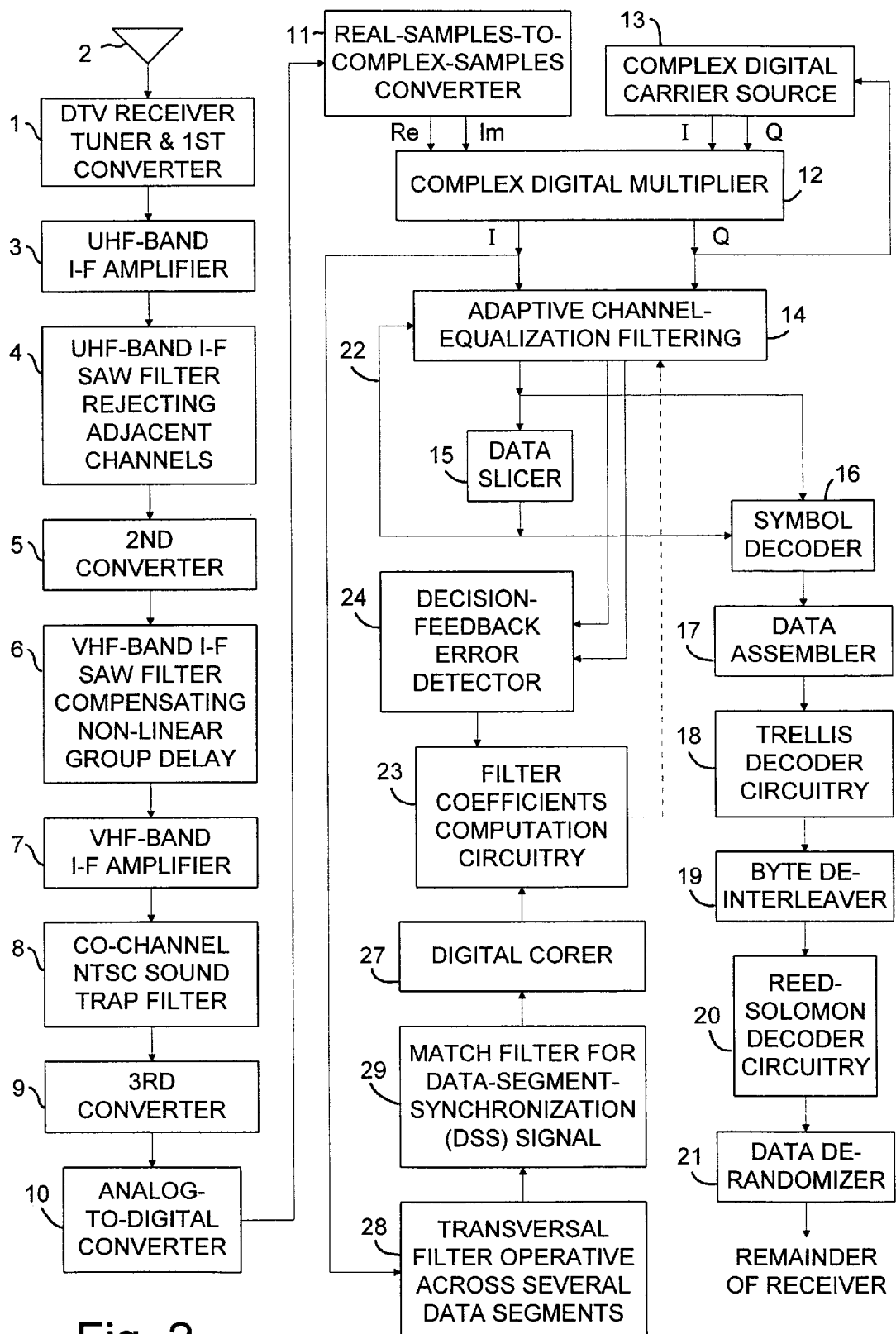

FIG. 2 shows alternative circuitry for extracting the training signal from the baseband symbol coding in reliance upon the data segment synchronizing (DSS) signals. In FIG. 2 the digitized baseband symbol coding recovered as the in-phase (real) response of the complex digital multiplier 12 is applied as input signal to a transversal filter 28 operative across several data segments. The transversal filter 28 accumulates corresponding samples from each data segment to generate each sample of its response, which is supplied as input signal to a match filter 29 for DSS signal. The DSS component in each data segment will correlate from data segment to data segment to be strongly reinforced in the response of the transversal filter 28. The random data in each data segment will not be correlated from data segment to data segment and will tend to average to relatively low value in the response of the transversal filter 28. The strengthened DSS signal and its ghosts each exhibits excursions in both positive and negative arithmetic senses. The match filter 29 responds to the strengthened DSS signal and its ghosts with responses each of which peaks each more narrowly, with excursion in only one arithmetic sense. In FIG. 2 the match filter 29 response is supplied to the digital corer 27, which extracts the training signal applied to the computer 23 that is used to calculate the filter coefficients for the channel-equalization filtering 14. In a less preferred embodiment of the invention, the less significant bits of the match filter 29 response are discarded, and the more significant bits of the match filter 29 response are applied to the computer 23 as training signal.

The cascade connection of the transversal filter 28 and the succeeding match filter 29 in FIG. 2 is a functional equivalent of the cascade connection of the transversal filter 26 after the match filter 25 for DSS signal in FIG. 1, as will be appreciated by one skilled in the art of digital filter design. The cascade connection of the transversal filter 28 before the match filter 29 for DSS signal in the cascade connection per FIG. 2 provides a considerable saving in digital hardware over the cascade connection of the transversal filter 26 after the match filter 25 for DSS signal per FIG. 1, the reasons for which saving will be disclosed further on in this specification when describing the structure shown in FIG. 5 of the drawing. One skilled in the art of digital filter design will realize that there are other equivalent filters. One canonic equivalent filter comprises match filters for DSS signal in cascade connection with intervening 828-symbol-epoch delay lines, with the match filter responses being summed. The more significant bits of the summed match filter responses supplies the desired training signals. One skilled in the art of digital filter design will realize that there are filters of inverse-canonic form that are the equivalents of those already described, permitting the extraction of data segment synchronizing signals and their ghosts from baseband symbol coding for application to said computer as training signal. Canonic filters are preferred since they require less hardware.

Figure 4:
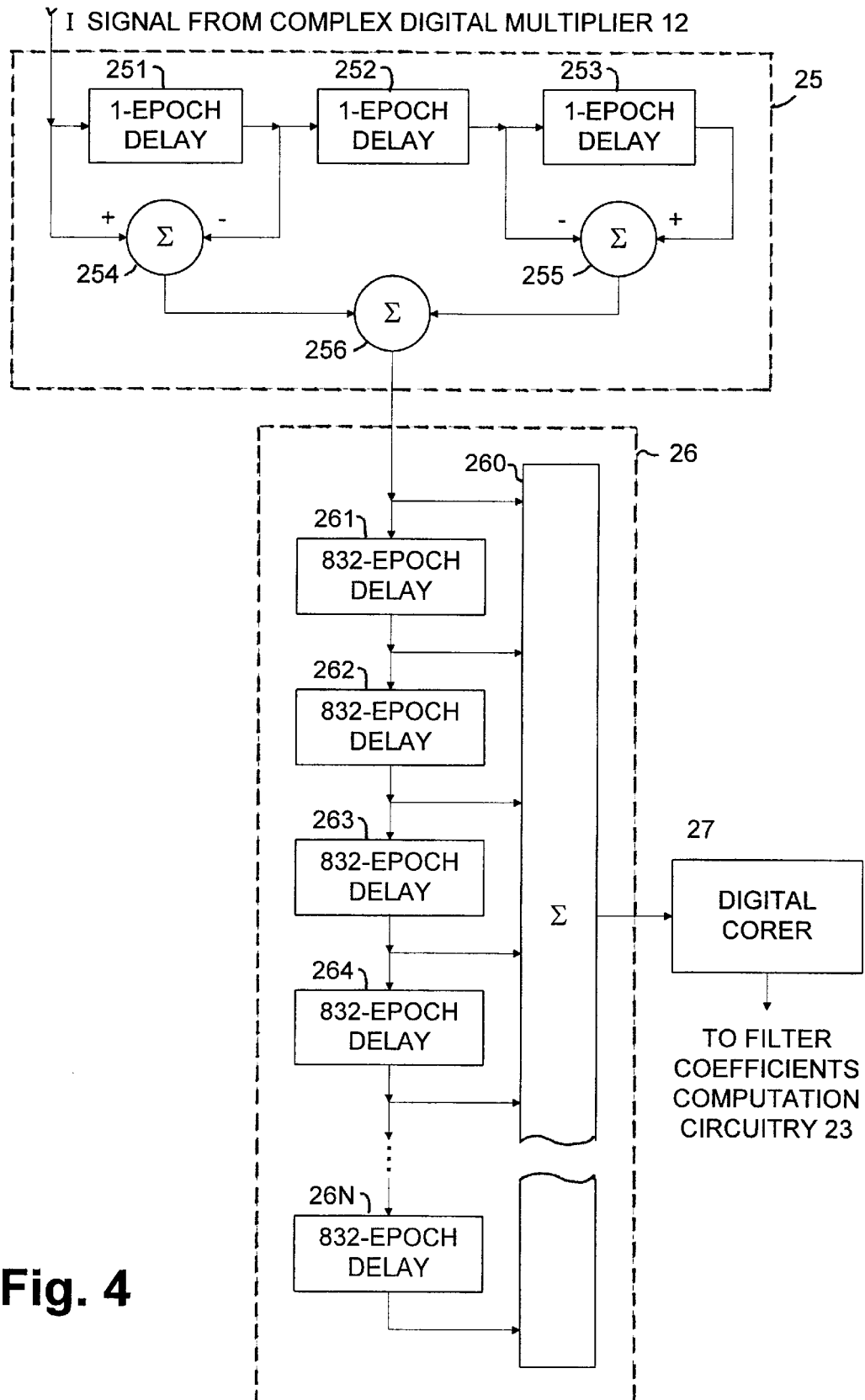
FIG. 4 is a block schematic diagram showing in more detail a portion of a DTV signal receiver of the type shown in FIG. 1.

FIG. 4 shows in detail one possible construction of the cascade filter connection of the match filter 25 and the succeeding transversal filter 26 shown generally in FIG. 1. In FIG. 4 the match filter 25 includes clocked delay elements 251, 252 and 253 cascaded to form a first tapped delay line with first, second, third and fourth successive taps at one-symbol-epoch intervals. The delay elements 251, 252 and 253 preferably are clocked at a multiple, usually two, of symbol or baud rate. The match filter 25 of FIG. 4 includes circuitry for combining the signals at said first, second, third and fourth successive taps in 1:(−1):(−13):1 ratio for generating a match filter response to baseband symbol coding applied as input signal to the first tapped delay line. FIG. 4 shows this combining circuitry comprising a digital subtractor 254 for differentially combining the first and second tap responses, a digital subtractor 255 for differentially combining the third and fourth tap responses and a digital adder 256 for additively combining the difference signals from the subtractors 254 and 255. Alternatively, this combining circuitry could comprise a digital adder for additively combining the first and fourth tap responses, another digital adder for additively combining the second and third tap responses and a digital subtractor for differentially combining the sum signals from the adders.

In FIG. 4 the transversal filter 26 includes an (N+1)-input digital adder 260 and a second tapped delay line composed of N clocked delay elements 261, 262, 263, 264,. . . 26N in cascade, each providing respective 832-symbol-epoch delay. N is a large positive integer, e. g. 311. Signals from the N successive taps at 832-symbol-epoch intervals in this second tapped delay line are applied as summands to the adder 260, which supplies its sum output signal to the digital corer 27. In FIG. 4 the transversal filter 26 includes an (N+1)-input digital adder 260 and a second tapped delay line with N delay elements 261, 262, 263, 264,. . . 26N each providing respective 832-symbol-epoch delay. Signals from the N+1 successive taps at 832-symbol-epoch intervals in this second tapped delay line are applied as summands to the adder 260, which supplies the more significant bits of its sum output signal to the computer 23 via a wired connection 27 to be used as training signal for calculating filter coefficients for the channel-equalization filtering 14. For extraction of training signal therefrom. If the adder 260 has a tree structure with the terminal adder having a 14-bit sum register, to express a two's complement number ranging from −8192 to +8191 in decimal terms, the integrated DSS signal integrates to a peak amplitude of +6240 over a data field of 312 data segments, supposing the DSS signal to switch between normalized values of −5 and +5. Ghosts 20 dB down in amplitude integrate over the data field of 312 data segments to a peak amplitude of +624 or −624. Supposing the 14-bit sum from the terminal adder to be in two's complement form, in the digital corer 27 the six least significant bits of that sum can be replaced by sign bits of the sum, and the sign bit added to the modified sum. This digital coring operation results in a digital corer 27 response with little more than 10% error in the detected amplitude of a ghost 20 dB down in amplitude. The match filter 25 response to random data being integrated over 312 data segments by the transversal filter 26 has an expected amplitude that is equal to the sum of 1248 symbol samples randomly chosen from values of −7, −5, −3, −1, +1, +3, +5 and +7, which usually will not range too far from zero. The coring operation in the digital corer 27 suppresses the result of match filter 25 response to random data as integrated over 312 data segments by the transversal filter 26, presuming that result not to greatly exceed its normally expected amplitude.

Figure 5:
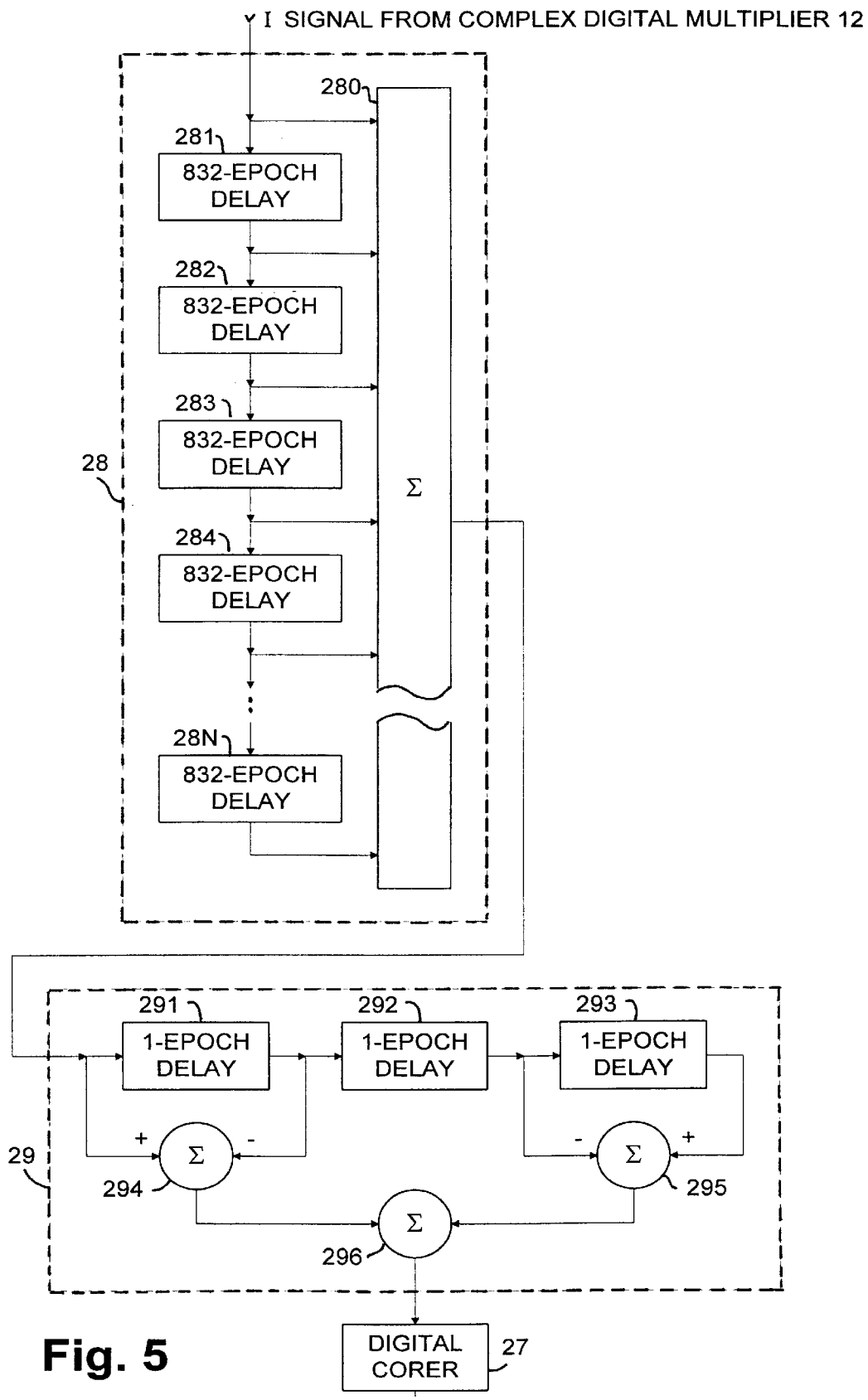
FIG. 5 is a block schematic diagram showing in more detail a portion of a DTV signal receiver of the type shown in FIG. 2.

FIG. 5 shows in detail one possible construction of the cascade filter connection of the transversal filter 28 and the succeeding match filter 29 shown generally in FIG. 2. In FIG. 5 the match filter 29 includes clocked delay elements 291, 292 and 293 cascaded to form a tapped delay line with first, second, third and fourth successive taps at one-symbol-epoch intervals. The match filter 29 of FIG. 5 includes circuitry for combining the signals at said first, second, third and fourth successive taps in 1:(−1):(−1):1 ratio for generating a match filter response to baseband symbol coding. FIG. 5 shows this combining circuitry comprising a digital subtractor 294 for differentially combining the first and second tap responses, a digital subtractor 295 for differentially combining the third and fourth tap responses and a digital adder 296 for additively combining the difference signals from the subtractors 294 and 295. Alternatively, this combining circuitry could comprise a digital adder for additively combining the first and fourth tap responses, another digital adder for additively combining the second and third tap responses and a digital subtractor for differentially combining the sum signals from the adders.

In FIG. 5 the transversal filter 28 includes an (N+1)-input digital adder 280 and a tapped delay line composed of N clocked delay elements 281, 282, 283, 20 284,. . . 28N in cascade, each providing respective 832-symbol-epoch delay. Signals from the N+1 successive taps at 832-symbol-epoch intervals in this tapped delay line are applied as summands to the adder 280, which supplies its sum output signal to the match filter 29 for DSS signal. The FIG. 5 transversal filter 28 differs from the FIG. 4 transversal filter 26 in that the dynamic range of the signals that its elements need to accommodate is four times smaller. This is because only the baseband symbol coding rather the correlated response of the match filter 29 to that coding is transferred through the cascaded N delay elements 281, 282, 283, 284,. . . 28N. So the elements of the FIG. 5 transversal filter 28 can have two bits less width than the FIG. 4 transversal filter 26. This provides for a considerable saving in hardware, even though the bit width of the elements in the FIG. 5 match filter 29 is increased from the bit width of the elements in the FIG. 4 match filter 25 by a amount equal to the logarithm base two of N rounded up to an integer. I. e., the bit width of the elements in the FIG. 5 match filter 29 would be nine bits wider if the resolution of the cascade filter connection is to be maintained and if N+1 is between 256 and 512, as presumed. The increase in the match filter 29 hardware as compared to the match filter 25 hardware has little effect on overall hardware requirement, however, because of the small amount of clocked delay in the match filters.

Figure 3:
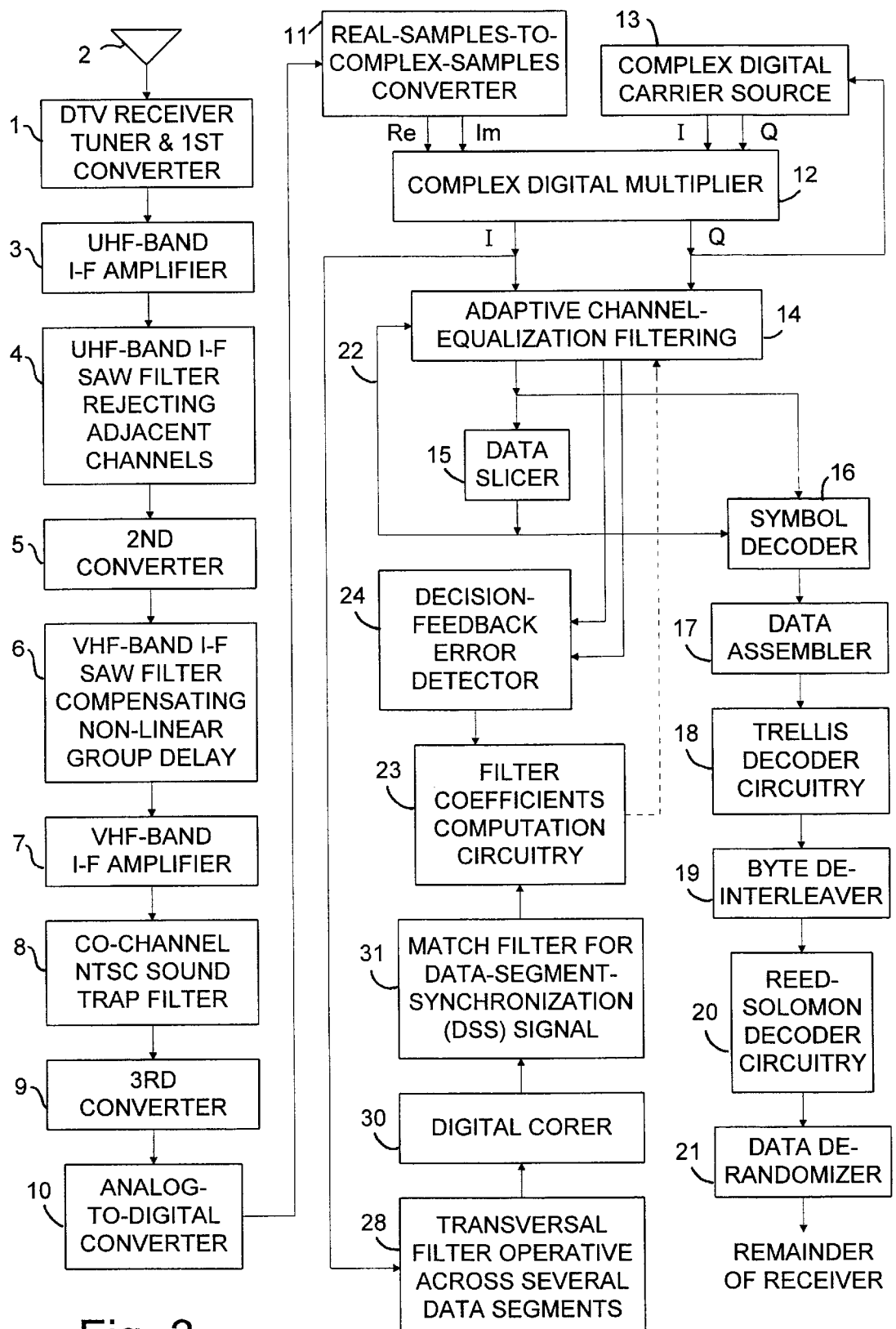

FIG. 3 shows a DTV signal receiver differing from that of FIG. 2 in that, instead of the transversal filter 28 being followed by the match filter 29 for DSS signal and then the digital corer 27, the transversal filter 28 is followed by a digital corer 30 and then a match filter 31 for DSS signal. The bit width requirements of the elements of the match filter 31 for DSS signal may be reduced compared to those of the match filter 29, since the rounding toward arithmetic zero in the digital corer 30 destroys information that might affect less significant bits of the match filter 29 response.

Figure 6:
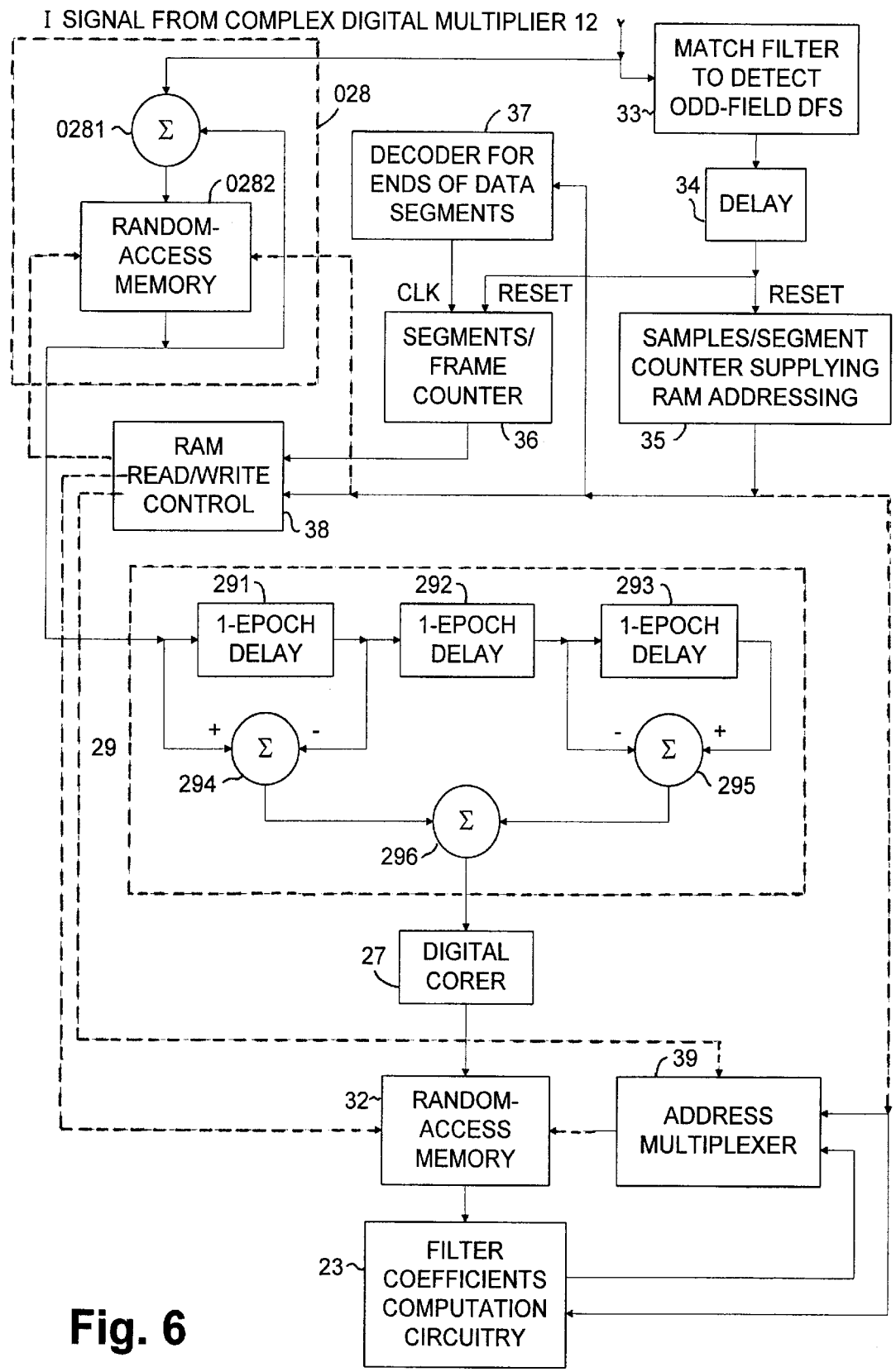
FIG. 6 is a block schematic diagram showing in more detail a portion of another DTV signal receiver of the type shown in FIG. 2.

FIG. 6 shows in detail another possible construction of the cascade filter connection of the transversal filter 28 and the succeeding match filter 29 shown generally in FIG. 2. The match filter 29 and the digital corer 27 thereafter are the same as in FIG. 5, but in FIG. 6 the transversal filter 28 is constructed as an accumulator 028. The accumulator 028 includes a digital adder 0281 receptive of baseband symbol coding as a first summand input signal and a random-access memory 0282 operated in a read-and-then-write operation to delay the sum output signal from the adder 0281 by 832 symbol epochs to be fed back to the adder 0281 as a second summand input signal. Accumulation takes place over N+1 data segments, and N+1 will be presumed to be 312 in the following description of the operation of the accumulator 028. After accumulating over 312 data segments, the RAM 0282 is conditioned to be written over to all arithmetic. zeroes in the next data segment, after which accumulation is resumed. Halting accumulation after the final data segment of each data field and writing the RAM 0282 contents to all arithmetic zeroes in the initial data segment of the next data field is preferred because the data in those initial data segments are better excluded from accumulation since they are not completely random. To accommodate the accumulation of baseband symbol code therein, the RAM 0282 should be capable of storing data entries having nine bits greater bitwidth than baseband symbol coding. Baseband symbol coding usually has a bitwidth of more than eight bits—typically, ten to twelve bits.

The successive accumulation results generated by the accumulator 028 are supplied as input signal to the match filter 29, which supplies its response to these accumulation results as input signal to the digital corer 27. The digital corer 27 supplies the desired training signal during the final data segment of each data field, and a random-access memory 32 is written with that training signal. The contents of the RAM 32 can then be read to the computer 23 during the remaining data segments of the data field, to provide a basis for computing filtering coefficients for the adaptive channel-equalization filtering 14.

A preferred way for timing operations of to data frameparatus respective to data frames of the baseband symbol coding received from the complex digital multiplier 12 of FIG. 2 will now be described. A match filter 33 detects the occurrence of the PN511 sequence followed by triple PN63 sequence in the DFS signal in the initial data segment of each frame. The match filter 33 response is delayed by the clocked digital delay line 34 to reset count output signals from counters 35 and 36 to prescribed initial values at the beginning of the second data segment of the data frame. The counter 35 counts samples per data segment and is constructed to roll over its count to initial value every time the number of samples in a data segment has been counted. The count output from the counter 35 continuously supplies addressing to the RAM 0282 and selectively supplies addressing to the RAM 32, during the initial data segment of each data field. The counter 36 counts data segments per data frame, rolling over its count to initial value every time the number of data segments in a data frame has been counted if reset fails to be supplied at that expected time. A decoder 37 decodes the value of the count output from the sample counter 35 at the end of a data segment thereby generating pulses applied to the data segment counter 36 as its clock for counting. RAM read/write control circuitry 38 receives the count outputs from the counters 35 and 36. RAM read/write control circuitry 38 responds to these counts as follows.

RAM read/write control circuitry 38 applies read-then-write-over commands to the RAM 0282 every data segment of the data field except for the initial data segment of each field. More specifically, these commands require writing over of RAM 0282 contents with adder 0281 sum output signal. At the same time, the RAM read/write control circuitry 38 withholds write command from the RAM 32 and commands an address multiplexer 39 to apply the RAM 32 with addressing supplied from the computer 23.

During the initial data segment of each data field, the RAM read/write control circuitry 38 applies read-then-write-over-with-arithmetic zero commands to the RAM 0282. During the initial data segment of each data field, the RAM read/write control circuitry 38 supplies write command to the RAM 32 and commands the address multiplexer 39 to apply the RAM 32 with addressing supplied as count output from the computer 35. This implements the writing of training signal into the RAM 32 to be read to the computer 23 during the remainder of the data field.

The count output of the data segment counter 36 is conveniently reset either to arithmetic zero or to arithmetic one at the beginning of the second data segment of each data frame, with the RAM read/write control circuitry 38 being designed to suit the particular choice of initial value of data segment counter 36 count output signal.

The count output of the sample counter 36 is preferably reset to be zero several microseconds before the beginning of a data segment, so the computation of the times of ghost and principal signal reception can all be computed in a positive time reference framne. The preferred initial value established during reset will depend on the effective kernel width of the adaptive channel-equalization filter circuitry 14.

Methods described for timing operations of the FIG. 6 apparatus are readily simplified for use in timing operations of the FIG. 4 apparatus or the FIG. 5 apparatus.

Embodiments of the invention in which an accumulator is used for transverse filtering can be operated in a "cream skimming" mode where the locations of stronger ghosts are early identified, the locations stored in memory, and the accumulation continued with a suppressed zero at the identified locations to reduce the likelihood of overflow in an accumulator with less storage capability. The continuing availability of accumulation results in the FIG. 4 and FIG. 5 circuitry facilitates the design of other circuitry that can measure stronger ghosts in times that are shorter than a data field.

The DTV receivers of FIGS. 1, 2 and 3 all digitize the DTV intermediate frequency signals and then synchrodyne the digitized DTV I-F signals to baseband in the digital regime. DTV receivers that synchrodyne DTV I-F signals to baseband in the analog regime and then digitize the baseband symbol coding are known. Such DTV receivers can also be redesigned to extract training signal from the DSS signals in accordance with the invention.

What is claimed is:

1. In a digital television receiver having
   a demodulator for recovering baseband symbol coding,
   circuitry for extracting a training signal and ghosts thereof from said baseband symbol coding,
   a computer for generating a transmission channel characterization based on said training signal and ghosts thereof as extracted from said baseband symbol coding, and
   adaptive channel-equalization and ghost cancellation filter circuitry for said baseband symbol coding, said adaptive channel-equalization and ghost cancellation filter circuitry having weighting coefficients initialized in response to said transmission channel characterization,
   the improvement wherein said circuitry for extracting training signal from said baseband symbol coding is of a type that extracts data segment synchronizing signals and their ghosts from said baseband symbol coding for application to said computer, which computer then generates said transmission channel characterization by measuring multipath distortion based on the ghosting of said data segment synchronizing signals.

2. The improvement of claim 1, wherein said circuitry for extracting training signal from said baseband symbol coding comprises:
   a cascade filter connection for supplying a cascade filter response to said baseband symbol coding, from at least the more significant bits of which cascade filter response said training signal is extracted, said cascade filter connection including
   a match filter for data segment synchronizing signal and
   a transversal filter for generating an output signal therefrom by additively combining input signals supplied thereto at data segment intervals.

3. The improvement of claim 2, wherein said circuitry for extracting training signal from baseband symbol coding further comprises:

a corer for generating said training signal from said cascade filter response.

4. The improvement of claim 3, wherein said match filter for data segment synchronizing signal precedes said transversal filter in said cascade filter connection.

5. The improvement of claim 4, wherein said match filter for data segment synchronizing signal includes a first tapped delay line with first, second, third and fourth successive taps at one-symbol-epoch intervals and circuitry for combining the signals at said first, second, third and fourth successive taps in 1:(−1):(−1):1 ratio for generating a match filter response to said baseband symbol coding, which said baseband symbol coding is applied as input signal to said first tapped delay line.

6. The improvement of claim 5, wherein said transversal filter includes a second tapped delay line with a plurality of successive taps at 832-symbol-epoch intervals and circuitry for adding the signals at said plurality of successive taps for generating said cascade filter response as a transversal filter response to said match filter response, which said match filter response is applied as input signal to said second tapped delay line.

7. The improvement of claim 3, wherein said transversal filter precedes said match filter for data segment synchronizing signal in said cascade filter connection.

8. The improvement of claim 7, wherein said transversal filter includes a first tapped delay line with a plurality of successive taps at 832-symbol-epoch intervals and circuitry for adding the signals at said plurality of successive taps for generating a transversal filter response to said baseband symbol coding, which said baseband symbol coding is applied as input signal to said first tapped delay line.

9. The improvement of claim 8, wherein said match filter for data segment synchronizing signal includes a second tapped delay line with first, second, third and fourth successive taps at one-symbol-epoch intervals and circuitry for combining the signals at said first, second, third and fourth successive taps in 1:(−1):(−1):1 ratio for generating said cascade filter response as a match filter response to said transversal filter response, which said transversal filter response is applied as input signal to said second tapped delay line.

10. The improvement of claim 3 wherein said transversal filter comprises a digital adder and a memory operated as an accumulator.

11. The improvement of claim 10, wherein said match filter for data segment synchronizing signal includes a tapped delay line with first, second, third and fourth successive taps at one-symbol-epoch intervals and circuitry for combining the signals at said first, second, third and fourth successive taps in 1:(−1):(−1):1 ratio for generating said cascade filter response as a match filter response to a transversal filter response, which said transversal filter response is applied as input signal to said tapped delay line.

12. The improvement of claim 2, wherein said match filter for data segment synchronizing signal precedes said transversal filter in said cascade filter connection.

13. The improvement of claim 12, wherein said match filter for data segment synchronizing signal includes a first tapped delay line with first, second, third and fourth successive taps at one-symbol-epoch intervals and circuitry for combining the signals at said first, second, third and fourth successive taps in 1:(−1):(−1):1 ratio for generating a match filter response to said baseband symbol coding, which said baseband symbol coding is applied as input signal to said first tapped delay line.

14. The improvement of claim 13, wherein said transversal filter includes a second tapped delay line with a plurality of successive taps at 832-symbol-epoch intervals and circuitry for adding the signals at said plurality of successive taps for generating said cascade filter response as a transversal filter response to said match filter response, which said match filter response is applied as input signal to said second tapped delay line.

15. The improvement of claim 2, wherein said transversal filter precedes said match filter for data segment synchronizing signal in said cascade filter connection.

16. The improvement of claim 15, wherein said transversal filter includes a first tapped delay line with a plurality of successive taps at 832-symbol-epoch intervals and circuitry for adding the signals at said plurality of successive taps for generating a transversal filter response to said baseband symbol coding, which said baseband symbol coding is applied as input signal to said first tapped delay line.

17. The improvement of claim 16, wherein said match filter for data segment synchronizing signal includes a second tapped delay line with first, second, third and fourth successive taps at one-symbol-epoch intervals and circuitry for combining the signals at said first, second, third and fourth successive taps in 1:(−1):(−1):1 ratio for generating said cascade filter response as a match filter response to said transversal filter response, which said transversal filter response is applied as input signal to said second tapped delay line.

18. The improvement of claim 2 wherein said transversal filter comprises a digital adder and a memory operated as an accumulator.

19. The improvement of claim 18, wherein said match filter for data segment synchronizing signal includes a tapped delay line with first, second, third and fourth successive taps at one-symbol-epoch intervals and circuitry for combining the signals at said first, second, third and fourth successive taps in 1:(−1):(−1):1 ratio for generating said cascade filter response as a match filter response to a transversal filter response, which said transversal filter response is applied as input signal to said tapped delay line.

20. The improvement of claim 1, wherein said circuitry for extracting training signal from baseband symbol coding comprises:
   a transversal filter responsive to said baseband symbol coding received as its input signal for generating a transversal filter response by additively combining input signals supplied thereto at data segment intervals;
   a corer for generating cored transversal filter response from said transversal filter response; and
   a match filter for data segment synchronizing signal, for generating said training signal in response to said cored transversal filter response.

* * * * *